(12) United States Patent
Uchiumi et al.

(10) Patent No.: US 7,689,765 B2
(45) Date of Patent: Mar. 30, 2010

(54) CONTROL APPARATUS OF STORAGE UNIT, AND METHOD OF CONTROLLING THE CONTROL APPARATUS OF STORAGE UNIT

(75) Inventors: Katsuhiro Uchiumi, Tokyo (JP); Hiroshi Kuwabara, Tokyo (JP); Yoshio Mitsuoka, Tokyo (JP)

(73) Assignee: Hitachi, Ltd, Tokyo (JP)

( * ) Notice: Subject to any disclaimer, the term of this patent is extended or adjusted under 35 U.S.C. 154(b) by 327 days.

(21) Appl. No.: 11/737,713

(22) Filed: Apr. 19, 2007

(65) Prior Publication Data

US 2007/0192546 A1 Aug. 16, 2007

Related U.S. Application Data

(63) Continuation of application No. 11/508,594, filed on Aug. 22, 2006, now Pat. No. 7,216,206, which is a continuation of application No. 10/696,663, filed on Oct. 28, 2003, now Pat. No. 7,111,131.

(30) Foreign Application Priority Data

Oct. 28, 2002 (JP) ............................. 2002-313027

(51) Int. Cl.
*G06F 12/00* (2006.01)

(52) U.S. Cl. ....................................... 711/111
(58) Field of Classification Search ................ None
See application file for complete search history.

(56) References Cited

U.S. PATENT DOCUMENTS

| 4,747,047 A | 5/1988 | Coogan et al. |
| 6,289,398 B1 | 9/2001 | Stallmo et al. |
| 6,643,750 B2 | 11/2003 | Achiwa et al. |
| 7,111,131 B2 | 9/2006 | Uchiumi et al. |
| 7,146,448 B2 * | 12/2006 | Davies et al. ............... 710/302 |
| 7,380,060 B2 * | 5/2008 | Guha et al. .................. 711/114 |
| 2003/0158998 A1 * | 8/2003 | Smith ......................... 711/112 |
| 2003/0229764 A1 | 12/2003 | Ohno et al. |
| 2004/0123028 A1 | 6/2004 | Kanai et al. |
| 2005/0010735 A1 | 1/2005 | Ito et al. |

FOREIGN PATENT DOCUMENTS

JP 07-306844 A 11/1995

\* cited by examiner

*Primary Examiner*—Brian R Peugh
(74) *Attorney, Agent, or Firm*—Townsend and Townsend and Crew LLP

(57) ABSTRACT

A control apparatus of a storage unit having a first and a second communication ports for conducting communication with a computer, a first and a second processors that control respectively the first and the second communication ports, first and second storage devices that store respectively a first and a second queues for storing commands sent from the computer respectively to the first and the second communication ports, and a first nonvolatile memory that the first processor accesses, the first and the second processors executing the commands stored respectively in the first and the second queues to thereby control the communications with the computer, comprising a unit causing the second processor to implement execution of the command stored in the first queue; and a unit changing data stored in the first memory while the second processor is being caused to implement execution of the command stored in the first queue.

8 Claims, 7 Drawing Sheets

CHF PCB HARDWARE CONFIGURATION

PCI-X SECTION HARDWARE CONFIGURATION

CONTROL APPARATUS OF STORAGE UNIT, AND METHOD OF CONTROLLING THE CONTROL APPARATUS OF STORAGE UNIT

CROSS-REFERENCE TO RELATED APPLICATIONS

This application claims the benefit of priority to Japanese Patent Application No. 2002-313027 filed on Oct. 28, 2002, the full disclosure of which is incorporated herein by reference.

BACKGROUND OF THE INVENTION

1. Field of the Invention

The present invention relates to a control apparatus of a storage unit and to a method of controlling the control apparatus of the storage unit.

2. Description of the Related Art

A computer system can add new functions by changing a control program even after initiating operation. Ordinarily, the device is restarted in order to install a new control program in the device.

However, the system cannot be stopped in a computer system where continuous operation is demanded 24 hours a day 365 days a year.

For this reason, in a case where a control program of a control apparatus of a storage unit in a computer system is to be changed, technology has conventionally been proposed for changing the control program without stopping the input/output of data (e.g., see Japanese Patent Application Laid-Open Publication No. Hei7-306844).

To cite an example of another specific method, there is a method where software for managing a bus is installed in a server and the inflow of commands to a control section in which is installed a microprocessor that replaces the control program is temporarily prohibited. Because a plurality of buses are managed by this application, a storage control apparatus can receive commands through the bus connected to the control section whose control program is not being in the middle of being replaced. In other words, the input/output of data from the server is not completely stopped.

Moreover, another method is known where, even if a command is received from the server, the control section whose control program is in the middle of being replaced issues a retry request to the server and causes the server to wait until the replacement of the control program ends.

In this conventional technology, the fact that there are a plurality of buses that transfer data from the computer to the control apparatus of the storage unit is used to change the control program without stopping the overall input/output of data from the computer. However, the input/output of data from the computer is stopped with respect to the data transfer bus relating to the changing of the control program. For this reason, it has been necessary for the computer to conduct data input/output by bypassing this data transfer bus.

SUMMARY OF THE INVENTION

The present invention was conceived on the basis of the above and other standpoints, and it is an object thereof to provide a control apparatus of a storage unit and a method of controlling the control apparatus of the storage unit.

According to one aspect of the invention for achieving the above and other objects, it is possible to implement control program replacement while using the same I/F controller before and after replacement of the control program. Specifically, the microprocessor of another control section having the same function has the function of taking over the processing of the microprocessor whose control program is being replaced.

The local memories of each microprocessor are fixedly separated between a region to be initialized and a region that is not to be initialized at the time of control program replacement.

The microprocessor whose control program is to be replaced uses the region that is not to be initialized as a region for controlling a host computer interface controller and stores, in the region to be initialized, a microprocessor replacement control program received from the host computer.

Moreover, the region that is not to be initialized is used as an LM takeover region portion.

In order to achieve the above and other objects, according to a first aspect of the present invention there is provided a control apparatus of a storage unit, the control apparatus having a first communication port for conducting communication with a computer, a first processor that controls the first communication port, a first storage device that stores a first queue for storing a command for conducting the communication sent from the computer to the first communication port, a first memory that the first processor accesses, a second communication port for conducting communication with the computer, a second processor that controls the second communication port, and a second storage device that stores a second queue for storing a command for conducting communication sent from the computer to the second communication port, the first processor executing the command stored in the first queue to thereby control the communication with the computer, the second processor executing the command stored in the second queue to thereby control the communication with the computer, the control apparatus comprising a unit causing the second processor to implement execution of the command stored in the first queue; and a unit changing data stored in the first memory while the second processor is being caused to implement execution of the command stored in the first queue.

In order to attain the above and other objects, according to another aspect of the present invention, there is provided a method of controlling a control apparatus of a storage unit, the control apparatus having a first communication port for conducting communication with a computer, a first processor that controls the first communication port, a first storage device that stores a first queue for storing a command for conducting communication sent from the computer to the first communication port, a first nonvolatile memory that the first processor accesses, a second communication port for conducting communication with the computer, a second processor that controls the second communication port, and a second storage device that stores a second queue for storing a command for conducting communication sent from the computer to the second communication port, the first processor executing the command stored in the first queue to thereby control the communication with the computer, the second processor executing the command stored in the second queue to thereby control the communication with the computer, the method comprising the steps of:

causing the second processor to implement execution of the command stored in the first queue; and changing data stored in the first nonvolatile memory while the second processor is being caused to implement the execution of the command stored in the first queue.

Other features and objects than the above of the invention will become clear upon referring to the attached drawings and reading the description of the specification.

BRIEF DESCRIPTION OF THE DRAWINGS

For the full understanding of the invention and advantages thereof, the following description is to be read in conjunction with the accompanying drawings, in which.

DETAILED DESCRIPTION OF THE INVENTION

Summary of the Disclosure

Figure 1:
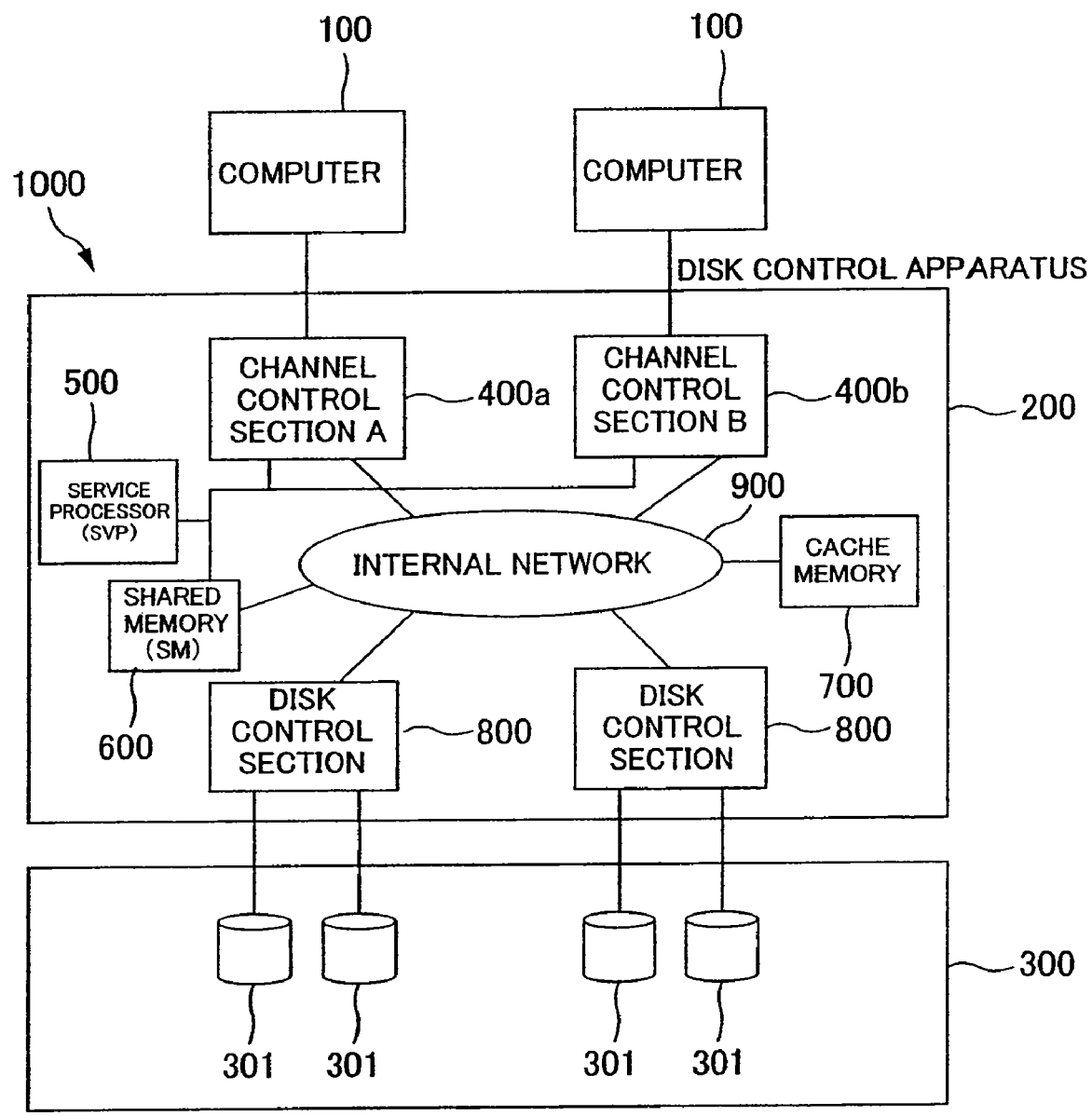
FIG. 1 is a block diagram showing an example configuration of a storage system according to an embodiment of the invention.

From the description of the specification, at least the following is made clear.

An aspect of this invention provides a control apparatus of a storage unit, the control apparatus having a first communication port for conducting communication with a computer, a first processor that controls the first communication port, a first storage device that stores a first queue for storing a command for conducting the communication sent from the computer to the first communication port, a first memory that the first processor accesses, a second communication port for conducting communication with the computer, a second processor that controls the second communication port, and a second storage device that stores a second queue for storing a command for conducting communication sent from the computer to the second communication port, the first processor executing the command stored in the first queue to thereby control the communication with the computer, the second processor executing the command stored in the second queue to thereby control the communication with the computer, the control apparatus comprising a unit causing the second processor to implement execution of the command stored in the first queue; and a unit changing data stored in the first memory while the second processor is being caused to implement execution of the command stored in the first queue.

According to this aspect, data stored in a nonvolatile memory, e.g., a control program of a processor, can be changed without stopping data transfer between the computer and the control apparatus of the storage unit. Thus, in a computer system where continuous operation is demanded 24 hours a day 365 days a year, the system specifications can be changed without stopping data access to the storage unit. Also, because it is unnecessary to change the data transfer bus from the computer, it becomes possible to change the control program without having to change the computer. Thus, it also becomes possible to change the control program via a network by, for example, operation from a remote place.

Moreover, according to this aspect, changing the control program also becomes possible without stopping data access to the storage unit even in a control apparatus of a storage unit connected to an open computer that adopts a communications protocol where dynamic switching of the data transfer bus is difficult, such as a fiber channel or an SCSI (Small Computer System Interface). For this reason, even if the connected computer is open or a mainframe, the control program can be changed without stopping data access to the storage unit.

Preferably, the unit causing the second processor to manage execution of the command stored in the first queue is a unit allowing the first processor to transfer the command stored in the first queue to the second queue and that allows the second processor to read the command for execution from the second queue.

By virtue of this, the second processor can read and execute, from the second queue, the command for data transfer with the computer via both of the first and second communication ports. Thus, it becomes possible to change the control program of the first processor without stopping data transfer via the first communication port.

The unit causing the second processor to manage execution of the command stored in the first queue may be a unit allowing the second processor to read the command for execution from the first queue.

By virtue of this, the second processor can execute the command for data transfer with the computer via both of the first and second communication ports. Thus, it becomes possible to change the control program of the first processor without stopping data transfer via the first communication port.

The unit changing data stored in the first memory may be a unit allowing the first processor to write data inputted from the outside over data stored in the first memory.

Another aspect of the present invention provides a method of controlling a control apparatus of a storage unit, the control apparatus having a first communication port for conducting communication with a computer, a first processor that controls the first communication port, a first storage device that stores a first queue for storing a command for conducting communication sent from the computer to the first communication port, a first nonvolatile memory that the first processor accesses, a second communication port for conducting communication with the computer, a second processor that controls the second communication port, and a second storage device that stores a second queue for storing a command for conducting communication sent from the computer to the second communication port, the first processor executing the command stored in the first queue to thereby control the communication with the computer, the second processor executing the command stored in the second queue to thereby control the communication with the computer, the method comprising the steps of causing the second processor to implement execution of the command stored in the first queue; and changing data stored in the first nonvolatile memory while the second processor is being caused to implement the execution of the command stored in the first queue.

Example of Overall Configuration

A block diagram showing an example configuration of a storage system 1000 according to an embodiment of the invention is shown in FIG. 1.

The storage system 1000 according to the present embodiment is disposed with a disk control apparatus (control apparatus of storage unit) 200 and a storage unit 300. The disk control apparatus 200 is disposed with channel control sections 400, disk control sections 800, a service processor (SVP: Service Processor) 500, a shared memory (SM: Shared Memory) 600, a cache memory 700 and an internal network 900.

Computers 100 store data in the storage unit 300 via the disk control apparatus 200. The computers 100 can be mainframe computers or open computers. Also, the computers 100 and the disk control apparatus 200 can be connected via a network or be directly connected to each other. In this case, various networks can be adopted for the network, such as a SAN (Storage Area Network), the Internet or a dedicated LAN (Local Area Network). Various protocols can be adopted for the communications protocol, such as a Fibre Channel, a SCSI, an ESCON or a FICON.

The channel control sections 400 are connected to the computers 100 and send data to and receive data from the computers 100. Data that the channel control sections 400 receive from the computers 100 is written in the storage unit 300 via the disk control sections 800. Also, data for which there is a read request from the computers 100 is read from the storage unit 300 via the disk control sections 800 and sent to the computers 100. It should be noted that the channel control sections 400, the disk control sections 800 and the computers 100 are not limited to two each, and that an optional number of each can be disposed.

The cache memory 700 is used to temporarily store data sent and received between the channel control sections 400 and the disk control sections 800 and reduce the frequency with which the storage unit 300 is accessed, whereby data access from the computers 100 is sped up. The shared memory 600 is a memory that is accessible from both of the channel control sections 400 and used to store control information.

The channel control sections 400, the disk control sections 800, the cache memory 700 and the shared memory 600 are interconnected by the internal network 900. A network of any kind of topology can be adopted as the internal network 900, such as a cross path connection or a bus connection. It should be noted that an aspect can also be adopted where the channel control sections 400, the disk control sections 800 and the like are directly connected.

The service processor 500 is a computer for maintaining and managing the disk control apparatus 200 and the storage unit 300. For example, changing of a control program executed in the channel control sections 400 is implemented by an instruction from the service processor 500. The service processor 500 can be configured so that it is internally housed in the disk control apparatus 200 or separately disposed. Also, the service processor 500 can be configured so that maintenance and management functions are given to a general-purpose computer.

The storage unit 300 is disposed with storage resources 301 for provision to the computers 100. Various resources can be adopted as the storage resources 301, such as a hard disk device, a flexible disk device, magnetic tape or a semiconductor storage unit.

Example Configuration of Disk Control Apparatus

Figure 2A:
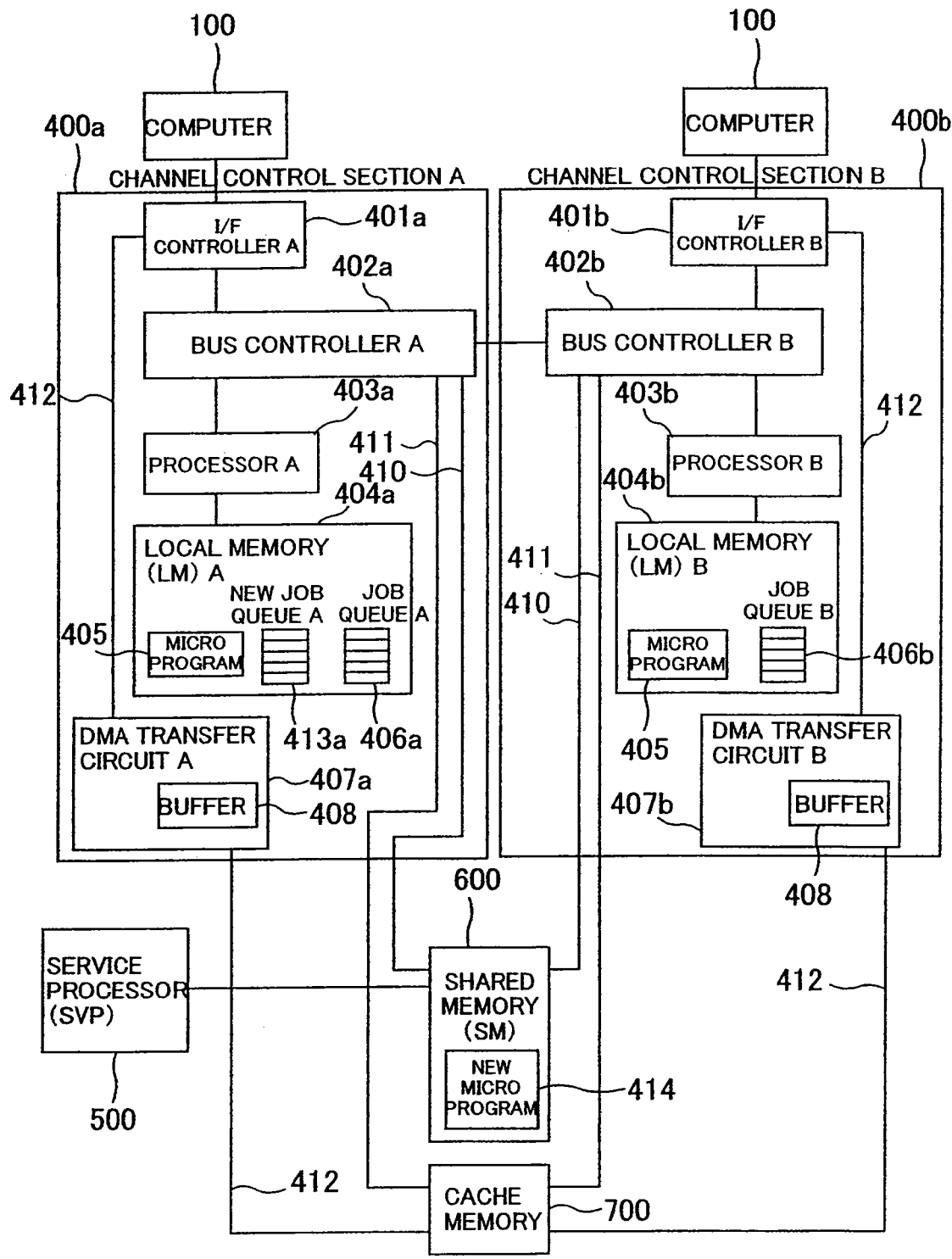
FIG. 2A is a block diagram showing an example configuration of a disk control apparatus according to the embodiment of the invention.

An example configuration of the disk control apparatus 200 according to the present embodiment is shown in FIG. 2A.

The channel control sections 400 are connected to the computers 100. Also, the channel control sections 400, the shared memory 600, the cache memory 700 and the service processor 500 are interconnected. The disk control sections 800 and the internal network 900 are omitted for the purpose of simplifying the drawing.

In the disk control apparatus 200 according to the present embodiment, two channel control sections 400, i.e., a channel control section A 400a and a channel control section B 400b, are disposed. Each of the channel control sections 400a and 400b is disposed with an I/F (Interface) controller (communication port) 401, a bus controller 402, a processor 403, a local memory 404 and a DMA (Direct Memory Access) transfer circuit 407.

The bus controllers 402 control data transfer inside the channel control sections 400 and interconnect the channel control sections 400.

The I/F controllers 401 function as communication ports for sending and receiving data with the computers 100. Data that the I/F controllers 401 receive from the computers 100 is transferred to the cache memory 700 via the DMA transfer circuits 407. Also, data stored in the cache memory 700 is imported to the I/F controllers 401 via the DMA transfer circuits 407 and transferred to the computers 100. Buffers 408 for data transfer conducted between the I/F controllers 401 and the cache memory 700 are disposed in the DMA transfer circuits 407.

Data transfer is conducted in accordance with a command (read command, write command, etc.) for data transfer sent from the computers 100. The I/F controllers 401 write the commands sent from the computers 100 in job queues 406 of the local memories 404. The processors 403 read the commands written in the job queues 406 and control the I/F controllers 401 and the DMA transfer circuits 407 in accordance with the commands, whereby data transfer with the computers 100 is controlled.

Microprograms (control programs) 405 are stored in the local memories 404. The microprograms 405 are programs (data) for controlling the operation of the processors 403. Thus, by changing the microprograms 405, the operation of the processors 403 can be changed. It should be noted that the local memories 404 may be nonvolatile memories such as a flash memory where the rewriting of data is possible, and can store storage data even without power being supplied thereto. Of course, the local memories 404 may be configured by volatile memories and power supply to the local memories 404 may be backed up with a battery, whereby the storage data can be maintained even if the power of the disk control apparatus 200 is cut off.

Changing of the microprograms 405 is conducted by the service processor 500 writing a new microprogram 414 to a predetermined address of the shared memory 600. At the time of startup, the processors 403 compare the version of the microprograms 405 stored at predetermined addresses of the local memories 404 with the version of the new microprogram 414 stored at the predetermined address of the shared memory 600. The reason the processors 403 conduct this operation at every startup is because the operation is described in that manner in the microprograms 405 or in the new microprogram 414. In a case where the version is not stored at the predetermined address of the shared memory 600 or where the versions of both programs are the same, the processors 403 operate in accordance with the microprograms 405 stored in the local memories 404.

Conversely, in a case where the versions of both programs are different, the new microprogram 414 stored in the shared memory 600 is copied to the predetermined addresses of the local memories 404. Thus, the microprocessors 403 operate in accordance with the new microprogram 414. It should be noted that causing the processors 403 to copy the new microprogram 414 to the local memories 404 from the shared memory 600 can be done with the old microprograms 405 or the new microprogram 414. In the case of the former, it becomes necessary to restart (reboot) the processors 403 at the stage where the new microprogram 414 has been copied to the local memories 404 to allow the processors 403 to identify the new microprogram 414. In the case of the latter, the processors 403 identify the new microprogram 414 while the new microprogram 414 is being copied to the local memories 404. In this case, restarting is unnecessary.

Figure 2B:
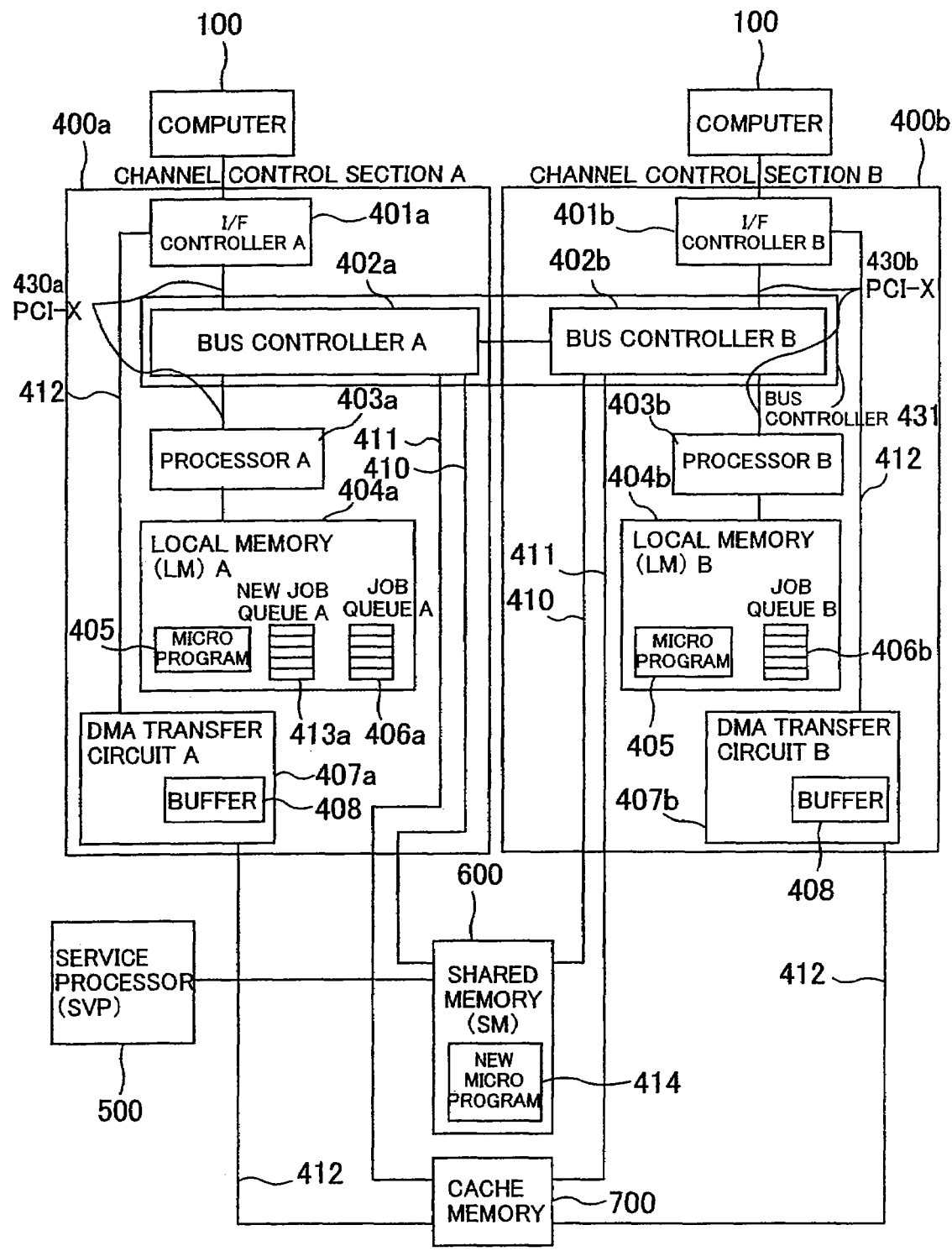
FIG. 2B is a block diagram showing, in detail, the disk control apparatus shown in FIG. 2A.

FIG. 2B shows a case where the I/F controller A 401a and the processor A 403a are connected by a PCI-X 430a via the bus controller 431.

Figure 5:
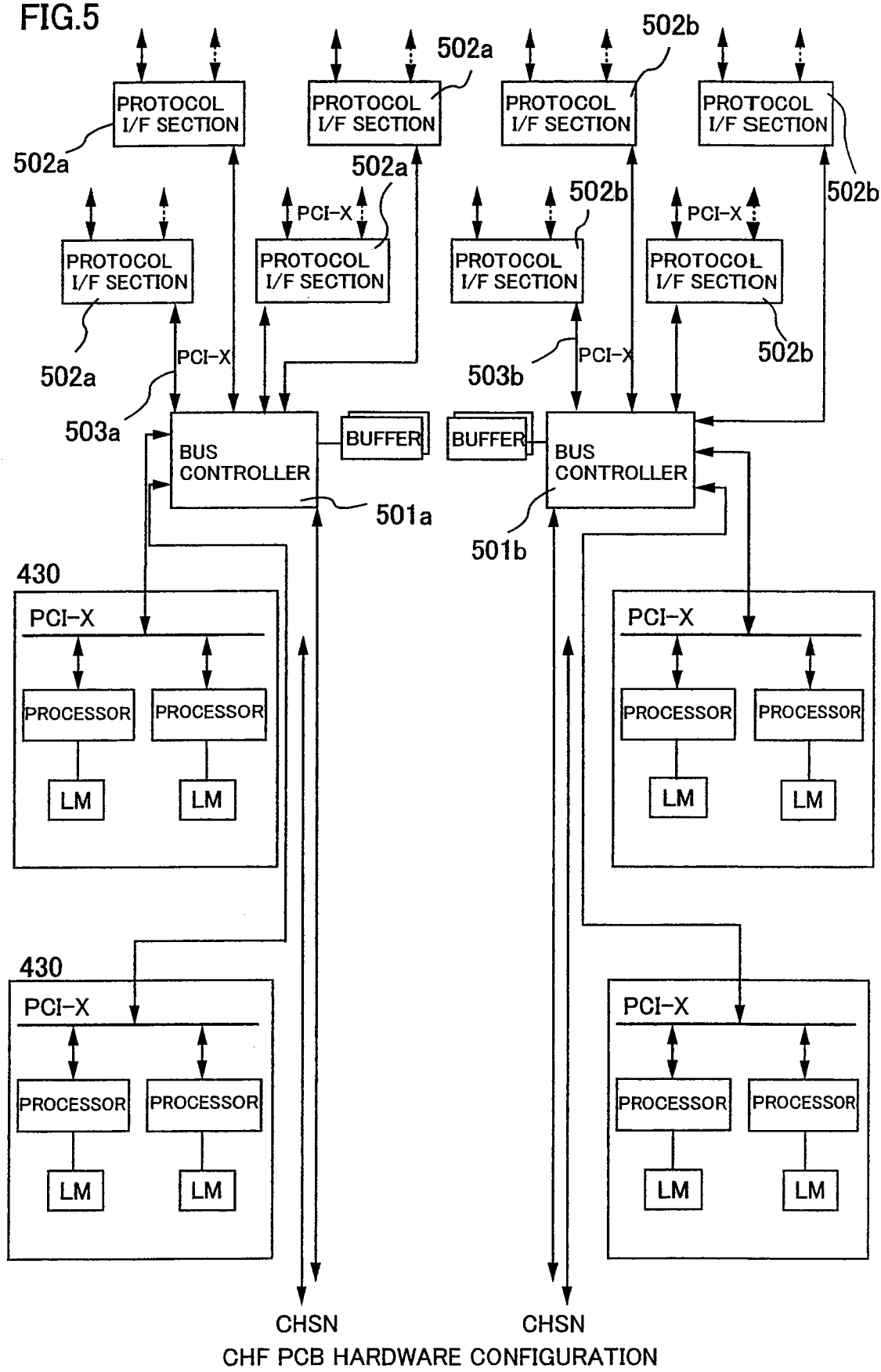
FIG. 5 is a block diagram showing the hardware configuration of a channel control section according to the embodiment of the invention.

FIG. 5 is a diagram showing the hardware configuration of a printed circuit board of the channel control sections shown in FIGS. 2A and 2B. Plural protocol I/F sections 502a and 502b are connected via PCI-X 503a and 503b to PCI controllers 501a and 501b called bus controllers.

Figure 6:
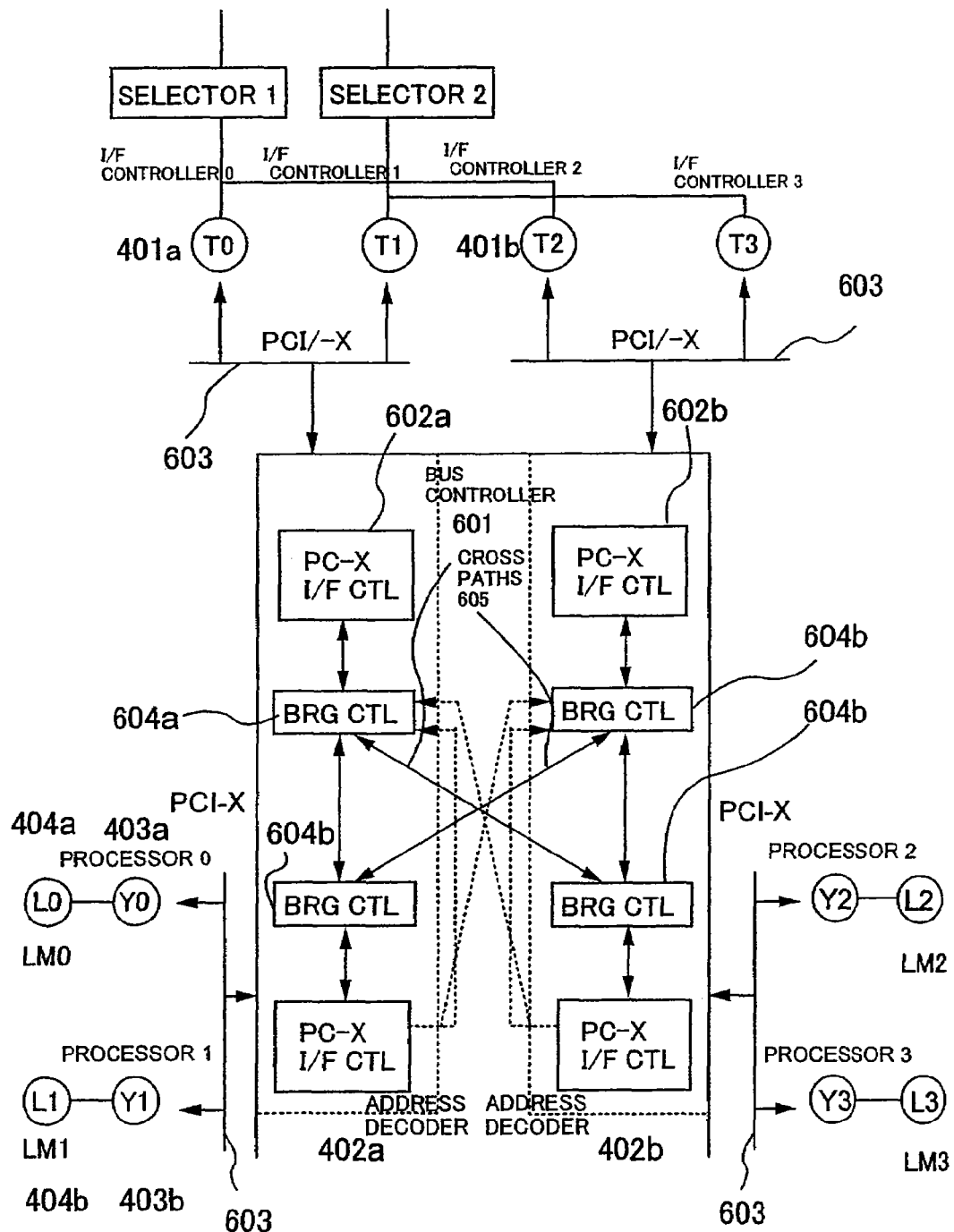
FIG. 6 is a block diagram showing the configuration of a bus controller according to the embodiment of the invention.

FIG. 6 is a diagram describing the bus controller in detail. A bus controller 601 is configured so as to be functionally separated into the bus controller A 402a and the bus controller B 402b. Each bus controller is connected to an external PCI-X bus 603 via PCI_X I/FCTL. Control between the PCI-X buses is conducted by bridge controllers 604a and 604b inside the bus controller 402a and the bus controller 402b. By connecting processors Y0 and Y1, which had conventionally been connected by a local bus, with a PCI bus, it becomes possible for the processors Y0 and Y1 to access their mutual local memories.

Now, in a case where the access paths to the processor Y1 are T0 and T1 of FIG. 6 and the access paths to the processor Y1 are T2 and T3, cross paths 605 for delivering, to the processor Y0, commands received from T2 and T3 are included when the control program of Y1 is to be replaced.

For example, in a case where access with respect to Y0 from T0 and T1 is set as ordinary access paths, these access paths become self access paths and the access paths to Y1 from T0 and T1 become other access paths.

The present invention defines cross paths 605, and the self access paths and the other access paths are mapped to addresses that are different on the PCI.

The microprogram of each processor manages the addresses of the self access paths and the other access paths by offsetting, whereby it can take care of and conduct processing that another processor is to conduct while the microprogram of that processor is being replaced.

Change Processing of the Microprograms

Figure 3:
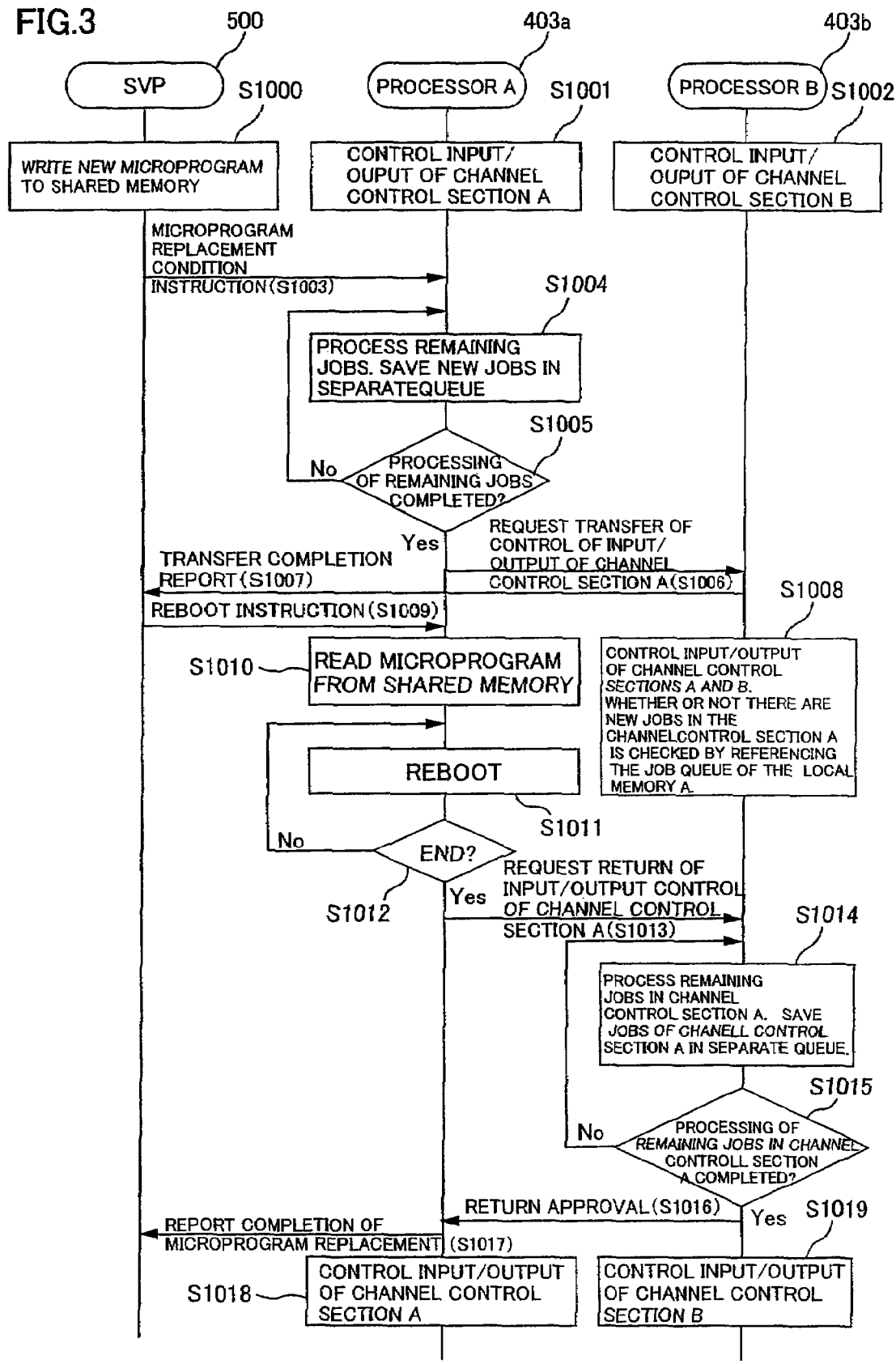
FIG. 3 is a flow chart showing the flow of change processing of a microprogram according to the embodiment of the invention.

A flow chart showing the flow of change processing of the microprograms according to the present embodiment is shown in FIG. 3. Here, a case will be described as an example where the microprogram 405 of the processor A 403a in FIG. 2A is changed.

Before the microprogram 405 of the processor A 403a is changed, the processor A 403a controls data input/output of the channel control section A 400a via the I/F controller A 401a, and the processor B 403b controls data input/output of the channel control section B 400b via the I/F controller B 401b (S1001, S1002).

In a case where the microprogram 405 of the processor A 403a is to be changed, first, the service processor 500 writes the new microprogram 414 in the shared memory 600. Then, a microprogram replacement instruction is sent to the processor A 403a (S1000, S1003).

The processor A 403a that has received the replacement instruction continues to execute jobs (input/output processing) currently running but does not execute new jobs from the computer 100. New jobs are stored in a new job queue A 413a separate from the job queue A 406a disposed in the local memory 404a (S1004). Here, at the point in time when the processor 403a has received the replacement instruction from the service processor 500, unprocessed jobs stored in the job queue A 406a can be moved to the new job queue A 413a or processed as currently running jobs.

When processing of the currently running jobs ends (S1005), the processor A 403a sends an instruction to the processor B 403b to conduct input/output processing of the channel control section A 400a. Then, jobs (input/output commands) stored in the new job queue A 413a are transferred to the job queue B 406b of the local memory B 404b (S1006). Thus, the processor B 403b becomes able to conduct input/output processing of the channel control section A 400a. Here, an aspect may be configured so that jobs stored in the new job queue A 413a are not transferred to the job queue B 406b of the local memory B 404b. In this case, the processor B 403b conducts input/output processing of the channel control section A 400a by referencing the new job queue A 413a of the local memory A 404a. When the processor B 403b receives the instruction and jobs from the processor A 403a, it sends a report to the service processor 500 that it will conduct input/output processing of the channel control section A 400a (S1007).

The service processor 500 that has received the report issues a restart (reboot) command to the processor A 403a (S1009).

When this happens, the processor A 403a compares the version of the microprogram 405 stored at the predetermined address of the local memory 404a with the version of the new microprogram 414 stored at the predetermined address of the shared memory 600. Here, if both programs are different, the new microprogram 414 stored in the shared memory 600 is copied to the predetermined address of the local memory 404a (S1010). When the new microprogram 414 has been copied to the local memory 404a, the processor A 403a restarts (S1011, S1012). Thus, the microprogram 405 that controls the operation of the processor A 403a can be changed to the new microprogram 414.

It should be noted that, as described above, the processor A 403a can be configured to immediately restart at the stage where it has received the restart instruction from the service processor 500. In this case, installation of the new microprogram 414 is conducted simultaneously while the new microprogram 414 stored in the shared memory 600 is being copied to the local memory 404.

The processor A 403a cannot control the I/F controller A 401a while the processor A 403a is changing the microprogram. Thus, in conventional technology, it has been necessary to change the data transfer path from the computer 100 to an I/F controller (e.g., the I/F controller B 401b) separate from the I/F controller A 401a in order to continue data input/output control between the computer 100.

However, in the microprogram changing according to the present embodiment, it is unnecessary to change the data transfer path. This is because the processor B 403b conducts control of the I/F controller A 401a. That is, this is because the processor B 403b also conducts data transfer processing between the computer 100 and the I/F controller A 401a in addition to data transfer processing between the computer 100 and the I/F controller B 401b while the processor A 403a changes the microprogram (S1008).

The processor B 403b conducts data transfer processing between the I/F controller A 401a and the computer 100 by processing the jobs moved from the local memory A 404a to the local memory B 404b. Also, the processor B 403b periodically references the new job queue A 413a of the local memory A 404a to check whether or not there are new jobs in the new job queue A 413a. Thus, the processor B 403b processes new jobs continuously sent to the channel control section A 400a from the computer 100. In a case where a new job is stored in the new job queue A 413a, the processor B 403b moves that job from the local memory A 404a to the local memory B 404b and conducts data transfer processing (S1008). Of course, an aspect can also be configured where a new job stored in the new job queue A 413a is not moved to the local memory B 404b.

The invention can also be configured so that data sent to and received from the computer 100 via the I/F controller A 401a is sent and received via the DMA transfer circuit A 407a or via the DMA transfer circuit B 407b.

When changing of the microprogram of the processor A 403a ends (S1012), the processor A 403a sends an instruction to the processor B 403b to return the input/output processing of the channel control section A 400a via the I/F controller A 401a to the processor A 403a (S1014).

When this happens, the processor B 403b that has received the instruction continues to execute currently running jobs of the channel control section A 400a but does not execute new jobs that the channel control section A 400a has received from the computer 100. That is, the processor B 403b does not send the jobs to the local memory B 404b even if there is a new job in the new job queue A 413a of the local memory A 404a. Thereafter, jobs that the channel control section A 400a has received from the computer 100 are stored in the job queue A 406a of the local memory A 404a (S1014).

When processing of the currently running jobs of the channel control section A 400a ends (S1015), the processor B 403b sends an instruction to the processor A 403a to return input/output processing of the channel control section A 400a (S1016). Next, the processor A 403a sends a report to the service processor 500 that it has finished changing the microprogram (S1017).

Thus, changing of the microprogram of the processor A 403a ends. Thereafter, the processor A 403a controls data input/output of the channel control section A 400a via the I/F controller A 401a, and the processor B 403b controls data input/output of the channel control section B 400b via the I/F controller B 401b (S1018, S1019).

The same is true of the case where the microprogram 405 of the processor B 403b is changed.

Another Example Configuration of the Disk Control Apparatus

Figure 4:
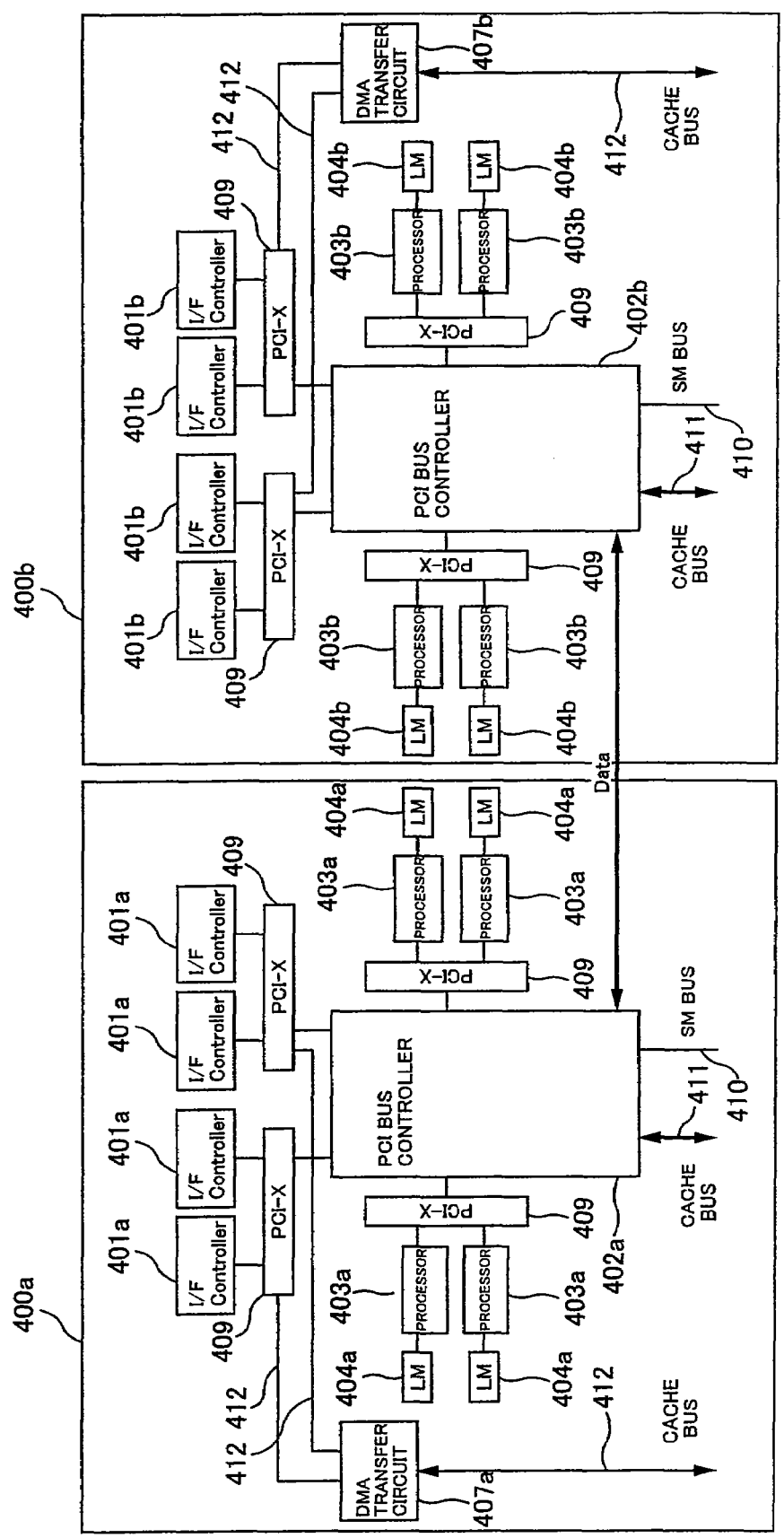
FIG. 4 is a block diagram showing another example configuration of the disk control apparatus according to the embodiment of the invention.

A block diagram showing another example configuration of the disk control apparatus 200 according to the present embodiment is shown in FIG. 4.

In the example configuration of FIG. 4, each of the channel control section A 400a and the channel control section B 400b is disposed with four I/F controllers 401, four processors 403 and four local memories (LM) 404. Additionally, a PCI-X (Peripheral Components Interconnect) is adopted as the specification of the buses connecting the respective components.

Changing of the microprograms in the case of this configuration can be conducted by the aspects described below.

That is, a first aspect is an aspect where, similar to what is shown in FIGS. 2A and 3, the processors B 403b belonging to the channel control section B 400b are made to conduct control of data transfer between the computer 100 that the processors A 403a had conducted until then while changing the microprogram of the processors A 403a belonging to the channel control section A 400a. According to this aspect, the microprogram of the disk control apparatus 200 can be changed without stopping data transfer between the computer 100 and the disk control apparatus 200 and without the need for changes to the data transfer bus between the computer 100 and the disk control apparatus 200.

Also, a second aspect is an aspect where changing of the microprogram is conducted using the processors within the same control section. According to this aspect, even in a disk control apparatus 200 disposed with only one channel control section 400, the microprogram of the disk control apparatus 200 can be changed without stopping data transfer between the computer 100 and the disk control apparatus 200 and without the need for changes to the data transfer bus between the computer 100 and the disk control apparatus 200.

Moreover, according to the example configuration shown in FIG. 4, the microprograms of a plurality of processors can be simultaneously changed without stopping data transfer between the computer 100 and the disk control apparatus 200 and without the need for changes to the data transfer bus between the computer 100 and the disk control apparatus 200.

Although the present invention has been set forth hereinabove based on the embodiments, the above examples are meant to facilitate understanding of the invention and should not be construed as limiting the invention. The invention can be changed and improved without deviating from the gist thereof, and equivalents thereof are also included in the invention.

Although the preferred embodiments of the present invention have been described in detail, it will be understood to those skilled in the art that they are variously be changed, permutated and altered without departing from the spirit and scope of the invention as defined in the appended claims.

What is claimed is:

1. A control apparatus of a storage unit comprising:
    a first communication port for conducting communication with a computer;
    a first processor that controls the first communication port;
    a first PCI-X bus disposed between the first communication port and the first processor for communication between the first communication port and the first processor;
    a first memory in data communication with the first processor;
    a second communication port for conducting communication with the computer;
    a second processor that controls the second communication port;
    a second PCI-X bus disposed between the second communication port and the second processor for communication between the second communication port and the second processor; and
    a unit configured to change at least a portion of a microprogram stored in the first memory while the second processor is being caused to implement execution of a command for data input or data output with the computer.

2. A control apparatus of a storage unit according to claim 1, further comprising:
    a first queue to store commands for communication between the computer and the first communication port; and
    a second queue to store commands for communication between the computer and the second communication port,
    wherein the command is initially stored in the first queue, wherein the unit is further configured to allow the first processor to transfer the command from the first queue to a second queue and to allow the second processor to read the command for execution from the second queue.

3. A control apparatus of a storage unit according to claim 1, further comprising:
a first queue to store commands for communication between the computer and the first communication port; and
a second queue to store commands for communication between the computer and the second communication port,
wherein the unit is further configured to allow the second processor to read the command for execution from the first queue.

4. A control apparatus of a storage unit according to claim 1, wherein the unit is further configured to allow the first processor to overwrite at least a portion of the microprogram with data received from a source external to the storage unit in order to change said at least a portion of the microprogram.

5. A method of controlling a control apparatus of a storage unit, a first communication port for communication with an external computer, a first processor that controls the first communication port, a first PCI-X bus disposed between the first communication port and the first processor for communication between the first communication port and the first processor, a first nonvolatile memory in data communication with the first processor accesses, a second communication port for communication with the external computer, a second processor that controls the second communication port, and a second PCI-X bus disposed between the second communication port and the second processor for communication between the second communication port and the second processor, the first processor executing a command stored in the first queue to control communication with the external computer, the second processor executing the command stored in the second queue to control communication with the external computer, the method comprising:
causing the first processor to access and execute first commands stored in a first queue relating to communication between the external computer and the first communication port;
causing the second processor to access and execute second commands stored in a second queue relating to communication between the external computer and the second communication port;
causing the second processor to access and execute one of the first commands stored in the first queue; and
changing at least a portion of a microprogram stored in the first nonvolatile memory while the second processor is being caused to implement the execution of said one of the first commands.

6. A method according to claim 5, wherein causing the second processor to access and execute one of the first commands stored in the first queue comprises allowing the first processor to transfer said one of the first commands to the second queue and allowing the second processor to read the transferred command from the second queue for execution thereof.

7. A method according to claim 5, wherein causing the second processor to access and execute one of the first commands stored in the first queue comprises allowing the second processor to read said one of the first commands from the first queue for execution thereof.

8. A method according to claim 5, wherein changing at least a portion of a microprogram stored in the first nonvolatile memory comprises allowing the first processor to overwrite data stored therein with data received from a source external to the storage unit.

* * * * *